US008263688B2

(12) United States Patent
Hamada et al.

(10) Patent No.: US 8,263,688 B2
(45) Date of Patent: Sep. 11, 2012

(54) DISPERSION-RETAINING AGENT FOR HYDRAULIC COMPOSITION

(75) Inventors: Daisuke Hamada, Emmerich (DE); Kenichiro Yabe, Wakayama (JP); Keiichiro Sagawa, Wakayama (JP); Masaaki Shimoda, Wakayama (JP); Yoshiaki Tanisho, Wakayama (JP); Yoshinao Kono, Wakayama (JP); Toshimasa Hamai, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 12/593,837

(22) PCT Filed: May 22, 2008

(86) PCT No.: PCT/JP2008/059861
§ 371 (c)(1),
(2), (4) Date: Oct. 28, 2009

(87) PCT Pub. No.: WO2008/143364
PCT Pub. Date: Nov. 27, 2008

(65) Prior Publication Data
US 2010/0113651 A1    May 6, 2010

(30) Foreign Application Priority Data

May 22, 2007    (JP) .................................. 2007-135680

(51) Int. Cl.
*C04B 24/26* (2006.01)
*C08K 3/00* (2006.01)
*C08F 220/26* (2006.01)
(52) U.S. Cl. ........................ 524/5; 526/320; 525/329.5
(58) Field of Classification Search ... 524/5; 525/329.5; 526/320
See application file for complete search history.

(56) References Cited

U.S. PATENT DOCUMENTS

| 5,911,820 | A | 6/1999 | Satoh et al. |
| 6,239,241 | B1 * | 5/2001 | Yamato et al. ........... 526/318.44 |
| 2003/0199616 | A1 | 10/2003 | Yamashita et al. |
| 2004/0250737 | A1 * | 12/2004 | Yaguchi et al. ............... 106/808 |

(Continued)

FOREIGN PATENT DOCUMENTS

EP    0 291 950 A1    11/1988

(Continued)

OTHER PUBLICATIONS

Machine translation of JP 2006-176380. Jul. 2006.*

(Continued)

*Primary Examiner* — Ling Choi
*Assistant Examiner* — John Uselding
(74) *Attorney, Agent, or Firm* — Birch, Stewart, Kolasch & Birch, LLP

(57) ABSTRACT

The present invention provides a dispersion-retaining agent for a hydraulic composition being excellent in both fluidity retainability and viscosity retainability and further a dispersion-retaining agent exhibiting fluidity retainability and viscosity retainability regardless of the type of hydraulic powder. The present invention relates to a dispersion-retaining agent for a hydraulic composition, containing a copolymer obtained by polymerizing specific monomer 1 represented by formula (1), with monomer 2 represented by formula (2), the corresponding alcohol compound of which satisfies specific physical properties, wherein, in the constituent monomers of the copolymer, the proportion of the monomer 1 is in a specific range, a specified monomers is used as at least a part of the monomer 2, and the proportion of monomers having an acid group or a neutralized group thereof is 5% by weight or less.

9 Claims, 3 Drawing Sheets

U.S. PATENT DOCUMENTS

2007/0173568 A1 * 7/2007 Nishikawa et al. ............... 524/5

FOREIGN PATENT DOCUMENTS

| | | |
|---|---|---|
| EP | 0 846 090 B | 6/1998 |
| JP | 62-78137 A | 4/1987 |
| JP | 62-119147 A | 5/1987 |
| JP | 7-223852 A | 8/1995 |
| JP | 7-247149 A | 9/1995 |
| JP | 10-81549 A | 3/1998 |
| JP | 2000-247706 A | 9/2000 |
| JP | 2003-128738 A | 5/2003 |
| JP | 2003-286057 A | 10/2003 |
| JP | 2003-286058 A | 10/2003 |
| JP | 2004-210587 A | 7/2004 |
| JP | 2004-210589 A | 7/2004 |
| JP | 2004-519406 A | 7/2004 |
| JP | 2006-52381 A | 2/2006 |
| JP | 2006-137629 A | 6/2006 |
| JP | 2006-176380 A | 7/2006 |
| JP | 2006-525219 A | 11/2006 |
| JP | 3874917 B2 | 11/2006 |
| WO | WO 97/48656 A1 | 12/1997 |

OTHER PUBLICATIONS

Notification of First Office Action issued Dec. 31, 2011, in Chinese Patent Application No. 200880015651.0, with English translation.

* cited by examiner

DISPERSION-RETAINING AGENT FOR HYDRAULIC COMPOSITION

FIELD OF THE INVENTION

The present invention relates to a dispersion-retaining agent for a hydraulic composition, a hydraulic composition admixture, and a hydraulic composition.

BACKGROUND OF THE INVENTION

To confer fluidity, admixtures (high-performance water reducing admixtures) such as those based on naphthalene, melamine, aminosulfonic acid or polycarboxylic acid have been used in hydraulic compositions such as concrete. Admixtures such as water-reducing admixtures are desired to have various capabilities such as conferment of fluidity on hydraulic compositions, retainability of fluidity (fluidity retention), and prevention of delay in hardening. From this viewpoint, there are also proposed improvements in the polycarboxylic acid-based admixtures.

For example, JP-A 7-247149 discloses that polymers obtained by polymerizing carboxylate monomers having a specific structure are used as an agent for preventing decrease in concrete fluidity and used in combination with a known cement admixture.

JP-A 10-81549, which corresponds to U.S. Pat. No. 5,911,820 or EP-B 846090, discloses that a concrete admixture composed of copolymers having specific ethylenically unsaturated monomer units and ethylenically unsaturated carboxylate units as structural units is used in combination with a high-performance water reducing admixture.

SUMMARY OF THE INVENTION

The present invention relates to a dispersion-retaining agent for a hydraulic composition, containing a copolymer obtained by polymerizing monomers containing monomer 1 represented by formula (1):

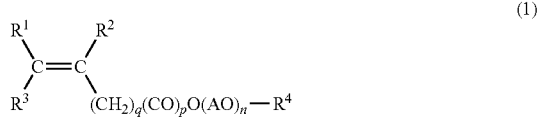

wherein $R^1$ to $R^3$ each represent a hydrogen atom or a methyl group, AO represents an oxyalkylene group having 2 to 4 carbon atoms, n represents the number of AO units added on the average per molecule and is a number of 5 to 150, $R^4$ represents a hydrogen atom or an alkyl group having 1 to 4 carbon atoms, q represents an integer of 0 to 2, and p represents 0 or 1, with monomer 2 represented by formula (2):

wherein $R^5$ represents a hydrocarbon group having 1 to 4 carbon atoms optionally containing a heteroatom, wherein:

in the constituent monomers of the copolymer, the proportion of the monomer 1 is 28 to 80% by weight when n in formula (1) is 5 to less than 50, or the proportion of the monomer 1 is 28 to 90% by weight when n in formula (1) is 50 to 150, in the constituent monomers of the copolymer, the total proportion of the monomer 1 and monomer 2 is 90% by weight or more, at least a part of the monomer 2 is monomer 2 wherein $R^5$ represents a hydrocarbon group having 2 or 3 carbon atoms optionally containing a heteroatom and has an OH group at the β-position of $R^5$, and in the constituent monomers of the copolymer, the proportion of monomers having at least one group selected from a carboxylic acid group, a phosphoric acid group and a neutralized group thereof is 5% by weight or less.

The present invention also relates to a dispersion-retaining agent for a hydraulic composition, containing a copolymer obtained by polymerizing monomers containing monomer 1 represented by formula (1), with monomer 2 represented by formula (2), wherein:

in the constituent monomers of the copolymer, the proportion of the monomer 1 is from (−0.05×n+28.8) to (0.12×n+75.4) % by weight wherein n is defined in formula (1), and the total proportion of the monomer 1 and 2 is 90% by weight or more, at least a part of the monomer 2 satisfies the relationship:

[(log $P$ value of an alcohol compound $R^5$—OH corresponding to $R^5$ in formula (2))/(molecular weight (Mw) of the monomer 2)]<−0.009, and in the constituent monomers of the copolymer, the proportion of monomers having at least one group selected from a carboxylic acid group, a phosphoric acid group and a neutralized group thereof is 5% by weight or less.

The present invention also relates to a hydraulic composition admixture containing the dispersion-retaining agent for a hydraulic composition according to the present invention and a polymer A having at least one group selected from a carboxylic acid group, a phosphoric acid group, a sulfonic acid group and a neutralized group thereof.

Further, the present invention relates to a hydraulic composition containing the dispersion-retaining agent for a hydraulic composition according to the present invention, a polymer A having at least one group selected from a carboxylic acid group, a phosphoric acid group, a sulfonic acid group and a neutralized group thereof, a hydraulic powder and water.

Furthermore, the present invention relates to use of the above-mentioned copolymer as a dispersion-retaining agent for a hydraulic composition and a method of maintaining the dispersion of a hydraulic composition, including mixing the above-mentioned copolymer with a hydraulic composition containing a polymer A having at least one group selected from a carboxylic acid group, a phosphoric acid group, a sulfonic acid group and a neutralized group, hydraulic powder and water.

DETAILED DESCRIPTION OF THE INVENTION

JP-A7-247149 and JP-A10-81549 supra disclose techniques of maintaining the fluidity of a hydraulic composition by a combination of a plurality of polymers. However, the fluidity retaining performance thereof varies depending on the qualities of cement, and thus the desired performance cannot be obtained in some cases. There are not found techniques by which the fluidity retaining effect is maintained and simultaneously the viscosity of a hydraulic composition is maintained. It is desired to exhibit the fluidity retaining effect and the viscosity retaining effect, regardless of the type of hydraulic powder (cement etc.) used in a hydraulic composition.

The present invention provides a dispersion-retaining agent for a hydraulic composition, which is excellent in fluidity retainability regardless of the type of hydraulic powder, without conferring initial fluidity.

A dispersion-retaining agent (viscosity-maintaining agent, fluidity-retaining agent) is added in expectation of the effect of fluidity retention and viscosity retention only and thus preferably does not exhibit initial fluidity, from the viewpoint of regulating fluidity and viscosity. A copolymer having an ethylenically unsaturated carboxylate ester as a structural unit is estimated to exhibit fluidity retainability by hydrolysis of the ester, but has been considered to be inferior in fluidity retainability unless the copolymer further has an ethylenically unsaturated carboxylic acid or the like as a structural unit, shown in for example JP-A 10-81549 (Comparative Product C-18). The copolymer further having an ethylenically unsaturated carboxylic acid also exhibits initial fluidity and thus hardly confers fluidity retainability without initial fluidity.

The present inventors used a specific ethylenically unsaturated carboxylate as a structural unit, thereby completing a dispersion-retaining agent capable of conferring fluidity retainability without containing a structural unit such as an ethylenically unsaturated carboxylic acid and capable of attaining fluidity retainability without conferring initial fluidity. This dispersion-retaining agent can confer fluidity retainability on a hydraulic composition regardless of the type of hydraulic powder.

According to the present invention, there can be provided a dispersion-retaining agent for a hydraulic composition, which does not confer initial fluidity and is excellent in fluidity retainability regardless of the type of hydraulic powder.

Generally, a hydraulic composition dispersant intended to confer low viscosity will be adsorbed onto cement at a high speed just after kneading to exhibit low viscosity, but tends to show a reduction in fluidity with time. This is probably because as the hydration reaction of cement proceeds, the dispersant on the surface of cement is buried in a reaction product of cement. A polycarboxylic acid-based copolymer containing oxyalkylene (AO) groups tends to increase both the fluidity and viscosity of concrete as the average number (n) of AO groups added on the average per molecule is increased. On the other hand, the polymer tends to decrease both the viscosity and fluidity of cement as n is decreased. Utilizing such characteristics of the dispersant, the present invention provides a dispersion-retaining agent containing the above-mentioned copolymer as an additive which when used in combination with the dispersant, can confer fluidity with time. It is estimated that the dispersion-retaining agent of the present invention using a specific acrylate as a monomer will undergo hydrolysis of the acrylate in an alkaline hydraulic composition followed by adsorbing the copolymer with time onto cement to exhibit fluidity retainability. Further, by using the monomer, the fluidity exhibited by the dispersion-retaining agent is made less variable even if the type of hydraulic powder used is changed. By using the monomer, fluidity retainability can be achieved even if the amount of monomers having an acid group selected from a carboxylic acid group and a phosphoric acid group or their neutralized group is 5% by weight or less. Further, the initial fluidity exhibited by the dispersion-retaining agent can be suppressed. The neutralized group refers to a group derived by neutralization from an acid group such as a carboxylic acid group or a phosphoric acid group.

<Monomer 1>

Monomer 1 is an unsaturated polyalkylene glycol monomer such as a polyalkylene glycol monoester monomer or a polyalkylene glycol alkyl ether monomer. In the monomer 1, AO in formula (1) represents an oxyalkylene group having 2 to 4 carbon atoms and is at least one member selected from an oxyethylene group, an oxypropylene group, and an oxybutylene group, among which an oxyethylene group is preferable. n is the number of AO units added on the average per molecule and represents a number of 5 to 150. From the viewpoint of fluidity retainability, n is preferably 9 to 130, more preferably 15 to 130, even more preferably 30 to 120 and even more preferably 50 to 110. From the viewpoint of viscosity retention, n is preferably 5 to 60, more preferably 5 to 45 and even more preferably 6 to 30. $R^4$ is a hydrogen atom or an alkyl group having 1 to 4 carbon atoms, preferably a hydrogen atom or a methyl group, more preferably a methyl group, from the viewpoint of fluidity retainability.

Examples of the monomer 1 include esters of acrylic acid or methacrylic acid with a polyalkylene glycol terminated with a lower alkyl group at one terminal, such as methoxypolyethylene glycol, methoxypolyethylenepolypropylene glycol, ethoxypolyethylene glycol, ethoxypolyethylenepolypropylene glycol, propoxypolyethylene glycol and propoxypolyethylenepolypropylene glycol; adducts of acrylic acid or methacrylic acid with ethylene oxide and propylene oxide; ethers of polyalkylene glycols terminated with a lower alkyl group at one terminal, with (meth) alkenyl alcohol; and adducts obtained by adding alkylene oxides having 2 to 4 carbon atoms to alkenyl alcohol. Specific examples include ω-methoxypolyethylene glycol monomethacrylate, ω-methoxypolyethylene glycol monoacrylate, polyoxyethylene monoallyl ether, ω-methoxypolyethylene glycol monoallyl ether, and 3-methyl-3-butene-1-ol polyoxyethylene monoallyl ether.

Examples of the monomer 1, preferable from the viewpoint of fluidity retainability, include esters of acrylic acid or methacrylic acid with a polyalkylene glycol terminated with an alkyl group at one terminal, among which ω-methoxypolyethylene glycol monomethacrylate and ω-methoxypolyethylene glycol monoacrylate are preferable, and ω-methoxypolyethylene glycol monomethacrylate is more preferable.

<Monomer 2>

Monomer 2 is an acrylate monomer and can be structurally grasped as an ester of acrylic acid with an alcohol compound represented by $R^5$—OH wherein $R^5$ is a hydrocarbon group having 1 to 4 carbons, preferably 2 to 3 carbon atoms, optionally containing a heteroatom. The heteroatom is an oxygen atom, a nitrogen atom, or the like.

At least a part of the monomer 2 may be monomer 2 wherein $R^5$ is a hydrocarbon group having 2 or 3 carbon atoms optionally containing a heteroatom and has an OH group at the β-position of $R^5$. The β-position of $R^5$ refers to position 2 (carbon atom (β-position) bound to a carbon atom (α-position) through which OH is bound to $R^5$) in the alcohol compound ($R^5$—OH) corresponding to $R^5$ in formula (2). In $R^5$—OH, $R^5$ has 2 or 3 carbon atoms and is preferable to have a hydroxy group on a carbon atom at the position 2 in $R^5$—OH.

In the present invention, specific monomers among the monomers represented by formula (2) are used as at least a part of the monomer 2. That is, those compounds (monomer 2-1) satisfying the relationship: the ratio of the log P value of $R^5$—OH corresponding to $R^5$ in formula (2) to the molecular weight (Mw) of the monomer 2 (that is, log P value of $R^5$—OH/molecular weight (Mw) of the monomer 2) <−0.009, are used as at least a part of the monomer 2. The monomer 2 other than the monomer 2-1, that is, those compounds satisfying the relationship: (log P value of $R^5$—OH/molecular weight (Mw) of the monomer 2) ≧−0.009 are referred to as monomer 2-2. $R^5$—OH satisfying such relationship includes ethylene glycol (log P value: −1.369), glycerin (log P value: −1.538), and the like. From the viewpoint of not only applicability to a broad range of hydraulic powder but also of fluidity retainability and viscosity, the proportion of the monomer 2-1 satisfying the relationship: (log P value of $R^5$—OH/molecular weight (Mw) of the monomer 2) <−0.009 is preferably 30 mol % or more, more preferably 50 mol % or more, even more preferably 70 mol % or more, even more preferably 90 mol % or more and even more preferably substantially 100 mol %, based on the total monomer 2.

Hydroxyethyl acrylate of formula (2) wherein $R^5$ is a hydroxyethyl group, and glyceryl acrylate of formula (2) wherein $R^5$ is a glycerol group, can be mentioned as the monomer 2-1 and have (log P value of $R^5$—OH/molecular weight (Mw) of the monomer 2) of (−1.369/116.1)=−0.0118 and (−1.538/145.1)=−0.0106, respectively.

From the viewpoint of fluidity retention, the monomer 2-1 is preferably hydroxyethyl acrylate. The monomer 2-2 includes methyl acrylate, hydroxybutyl acrylate and methoxyethyl acrylate. The monomer 2 may be a mixture of two or more monomers.

By introducing the monomer 2 into a copolymer serving as the dispersion-retaining agent of the present invention, the copolymer can maintain the fluidity of a hydraulic composition with time from an initial stage after addition to the hydraulic composition. It is estimated that the monomer 2 before addition to a hydraulic composition has an ester structure of acrylic acid and thus does not show initial dispersibility, but, after addition to a hydraulic composition, will be subjected to hydrolysis at its ester bond with time and converted into the corresponding carboxylic acid or carboxylate to allow the copolymer to be gradually adsorbed onto the surface of hydraulic powder and to maintain the dispersion of the hydraulic powder, thereby cancelling the increase in viscosity caused by hydration of the hydraulic powder. A methacrylate or an alkylene oxide adduct thereto, having a similar structure to the monomer 2, but being more hardly hydrolysable than acrylic acid, cannot achieve such an effect as the monomer 2.

It was found for the monomer 2-1 that there is a correlation between the ratio of the molecular weight of the monomer 2-1 to the log P (water/octanol partition coefficient) of the compound represented by $R^5$—OH having the substituent $R^5$ of the monomer 2-1 and a hydroxyl (OH) group (hereinafter, "log P" refers to the log P of this compound unless otherwise noted) and the speed at which the dispersibility of hydraulic powder is exhibited. That is, the hydrolyzability of an acrylate depends on a substituent of the acrylate. The hydrolysis occurs through a nucleophilic addition step of a water molecule to the acrylate and a subsequent step of elimination of an alcohol. The degree of steric hindrance and the easiness with which an alcohol is eliminated are considered to contribute to the hydrolyzability. As the molecular weight of the monomer is increased (that is, the steric hindrance is increased), the degree of hydrolysis is decreased, while as the hydrophilicity (log P) of the hydrolysable group of an alcohol constituting the acrylate is decreased, the degree of hydrolysis is increased. Accordingly, log P is standardized by the molecular weight (Mw) of the acrylate and used as an indicator of the efficiency of an introduced group (that is, the degree of formation of a carboxyl group). It follows that as the log P/molecular weight (Mw) ratio is decreased, the hydrolyzability of the monomer 2-1 is increased. In the present invention, this ratio is −0.009 or less, more preferably −0.010 or less and even more preferably −0.011 or less. Log P can be obtained as Clog P by using software CS Chem Draw Ultra (Ver. 8.0) available from Cambridge Soft, and this software can be executed with a Windows™ XP-based personal computer.

Conventionally, it has been estimated that the polycarboxylic acid-based polymer will not contribute to fluidity through steric repulsion unless the number of AO units added on the average per molecule is large to a certain extent, and the polymer will not significantly increase fluidity with time by increasing adsorbing groups through hydrolysis (column 0010, JP-A 10-81549). Absorbing groups of polycarboxylic acid etc. in the copolymer have also been considered essential. However, the present inventors made detailed examination of the structure, fluidity and retention performance of the copolymer, and as a result, they completed a dispersion-retaining agent highly versatile for cement and excellent in fluidity retainability without conferring initial fluidity, by regulating the balance between sterically repulsive units (AO units added on the average) and specific units (hydrolysable units) capable of turning with time to adsorbing groups.

<Copolymer>

The copolymer used in the present invention is a copolymer obtained by polymerizing monomers containing monomer 1 represented by formula (1) with monomer 2 represented by formula (2) wherein:

in the constituent monomers of the copolymer, the proportion of the monomer 1 is 28 to 80% by weight when n in formula (1) is 5 to less than 50, or the proportion of the monomer 1 is 28 to 90% by weight when n in formula (1) is 50 to 150, in the constituent monomers of the copolymer, the total proportion of the monomer 1 and monomer 2 is 90% by weight or more, at least a part of the monomer 2 is monomer 2 wherein $R^5$ represents a hydrocarbon group having 2 or 3 carbon atoms optionally containing a heteroatom and has an OH group at the β-position of $R^5$, and in the constituent monomers of the copolymer, the proportion of monomers having at least one group selected from a carboxylic acid group, a phosphoric acid group and a neutralized group thereof is 5% by weight or less.

The copolymer used in the present invention is alternatively a copolymer obtained by polymerizing monomers containing monomer 1 represented by formula (1), with monomer 2 represented by formula (2), wherein:

in the constituent monomers of the copolymer, the proportion of the monomer 1 is from (−0.05×n+28.8) to (0.12×n+75.4) % by weight wherein n is defined in formula (1), and the total proportion of the monomer 1 and 2 is 90% by weight or more, at least a part of the monomer 2 satisfies the relationship:

[(log $P$ value of an alcohol compound $R^5$—OH corresponding to $R^5$ in formula (2))/(molecular weight (Mw) of the monomer 2)]<−0.009, and in the constituent monomers of the copolymer, the proportion of monomers having at least one group selected from a carboxylic acid group, a phosphoric acid group and a neutralized group thereof is 5% by weight or less.

In the above copolymer, the monomer having at least one group selected from a carboxylic acid group, a phosphoric acid group and a neutralized group thereof is monomer 3 and the above shown proportion thereof may be that at feeding. The proportion of the monomers 3 is preferably 3% by weight or less, more preferably 1% by weight or less. No substantial content is even more preferable. That is, the constituent monomers are preferably the monomer 1 and 2 only.

The copolymer of the present invention may contain copolymerizable monomers other than the monomer 1 to 3. Such copolymerizable monomers include styrene, methyl methacrylate, dimethylaminoethyl methacrylate, and the like.

The lower proportion of the monomer 1 is $(-0.05 \times n + 28.8)$ % by weight because as the number of n is increased, repulsion among powders is increased so that fluidity retainability is exhibited even if the number of adsorbing chains of AO chains is small. From the viewpoint of fluidity retainability, the lower proportion of the monomer 1 is preferably $(-0.05 \times n + 30)$ % by weight and more preferably $(-0.05 \times n + 35)$ % by weight. The upper proportion of the monomer 1 is $(0.12 \times n + 75.4)$ % by weight, preferably $(0.12 \times n + 73.4)$ % by weight and more preferably $(0.12 \times n + 71.4)$ % by weight because the value of n is increased, fluidity is exhibited even if the amount of the monomer 2 that are adsorbing groups as described above is relatively smaller. These ranges were obtained from results of experiments on various structures. Accordingly, the proportion of the monomer 1 is preferably from $(-0.05 \times n + 30)$ to $(0.12 \times n + 73.4)$ % by weight and more preferably from $(-0.05 \times n + 35)$ to $(0.12 \times n + 71.4)$ % by weight.

When n in formula (1) is 5 to less than 50, the proportion of the monomer 1 in the constituent monomers of the copolymer may be 28 to 80% by weight, and when n in formula (1) is 50 to 150, the proportion of the monomer 1 may be 28 to 90% by weight.

When n in formula (1) is 5 to 150, the proportion of the monomer 1 in the constituent monomers of the copolymer is preferably 28 to 80% by weight, more preferably 30 to 78% by weight and even more preferably 35 to 75% by weight.

When n in formula (1) is 5 to less than 50, the proportion of the monomer 1 in the constituent monomers of the copolymer is preferably 28 to 78% by weight, more preferably 30 to 75% by weight and even more preferably 35 to 72% by weight. When n in formula (1) is 5 to 150, the proportion of the monomer 1 in the constituent monomers of the copolymer is preferably 33 to 80% by weight, more preferably 35 to 78% by weight and even more preferably 40 to 75% by weight.

Two or more monomer 1 different in n may be simultaneously used in the copolymer of the present invention. In the case of the monomer 1 different in n, n is the average (by molar fraction) of n among the monomer 1 (this hereinafter applies).

From the viewpoint of fluidity retainability, the total proportion of the monomer 1 and 2 in the total constituent monomers of the copolymer is preferably 90% by weight or more, more preferably 95% by weight or more, even more preferably 98% by weight or more and even more preferably substantially 100% by weight.

From the viewpoint of fluidity retainability, the proportion of the monomer 2 in the constituent monomers is preferably from $(0.05 \times n + 70)$ to $(-0.12 \times n + 26.6)$ % by weight and more preferably from $(0.05 \times n + 65)$ to $(-0.12 \times n + 28.6)$ % by weight.

When n in formula (1) is 5 to less than 50, the proportion of the monomer 2 in the constituent monomers of the copolymer is preferably 20 to 72% by weight, and when n in formula (1) is 50 to 150, the proportion of the monomer 1 is preferably 10 to 72% by weight.

When n in formula (1) is 5 to 150, the proportion of the monomer 2 in the constituent monomers of the copolymer is preferably 20 to 72% by weight, more preferably 22 to 70% by weight and even more preferably 25 to 65% by weight.

When n in formula (1) is 5 to less than 50, the proportion of the monomer 2 in the constituent monomers of the copolymer is preferably 22 to 72% by weight, more preferably 25 to 70% by weight and even more preferably 28 to 65% by weight. When n in formula (1) is 5 to 150, the proportion of the monomer 2 in the constituent monomers is preferably 20 to 67% by weight, more preferably 22 to 65% by weight and even more preferably 25 to 60% by weight.

From the viewpoint of fluidity retainability, the weight ratio of the monomer 1 to the monomer 2 (monomer 1/monomer 2) is preferably 25/75 to 95/5, more preferably 25/75 to 90/10, even more preferably 28/72 to 80/20, even more preferably 35/65 to 75/25 and even more preferably 45/55 to 65/35.

The monomers 3 are monomers having at least one group selected from a carboxylic acid group, a phosphoric acid group and their neutralized group. The acid groups of these weak acids function as adsorbing groups onto hydraulic powder such as cement. From the viewpoint of suppressing initial fluidity, the proportion of the monomers 3 in the total constituent monomers of the copolymer is 5% by weight or less, preferably 2.5% by weight or less and more preferably 1.0% by weight or less.

Examples of the monomers 3 include acrylic acid-based monomers such as di(2-hydroxyethyl)methacrylic acid phosphate, di(2-hydroxyethyl)acrylic acid phosphate, mono(2-hydroxyethyl)methacrylic acid phosphate, mono(2-hydroxyethyl)acrylic acid phosphate, polyalkylene glycol mono (meth)acrylate acid phosphate, acrylic acid, methacrylic acid, crotonic acid, maleic acid, fumaric acid, itaconic acid and citraconic acid, or alkali metal salts, alkaline earth metal salts, ammonium salts and amine salts of one or more of the above monomers and anhydrous compounds thereof such as maleic anhydride. When the monomers 3 are used, preferable examples thereof include methacrylic acid, acrylic acid, di(2-hydroxyethyl)methacrylic acid phosphate, and mono(2-hydroxyethyl)methacrylic acid phosphate.

Further, examples of other copolymerizable monomers include monomers having acid groups (or their neutralized groups) of strong acids, such as allylsulfonic acid, methallylsulfonic acid or alkali metal salts, alkaline earth metal salts, ammonium salts or amine salts of any of allylsulfonic acid and methallylsulfonic acid, (meth)acrylamides, N-methyl (meth)acrylamides, N,N-dimethyl(meth)acrylamides, 2-(meth)acrylamide-2-methasulfonic acid, 2-(meth)acrylamide-2-ethanesulfonic acid, 2-(meth)acrylamide-2-propanesulfonic acid, styrene and styrenesulfonic acid. These monomers may be copolymerized for example for regulation of the molecular weight of the copolymer. The acid groups of these strong acids occur as stable salts in a hydraulic composition and do not function as adsorbing groups onto hydraulic powder such as cement.

The copolymer in the present invention can be produced by methods known in the art. Examples of such methods include solution polymerization methods described in JP-A 62-119147 and JP-A 62-78137 and the like. That is, the copolymer can be produced by polymerizing the monomer 1 and 2 in the ratio defined above in a suitable solvent. That is, the monomers are polymerized in the following proportions in the total monomers used in producing the copolymer: the proportion of the monomer 1 is from $(-0.05 \times n + 28.8)$ to $(0.12 \times n + 75.4)$ % by weight wherein n is in formula (1); the total proportion of the monomer 1 and 2 is 90% by weight or more; and the proportion of the monomers 3 is 5% by weight or less.

The monomers are polymerized in the following proportions in the total monomers used in producing the copolymer: when n in formula (1) is 5 to less than 50, the proportion of the monomer 1 is 28 to 80% by weight; and when n in formula (1) is 50 to 150, the proportion of the monomer 1 is 28 to 90% by weight, the total proportion of the monomer 1 and 2 is 90% by weight or more, and the proportion of the monomers 3 is 5% by weight or less.

A solvent used in the solution polymerization method includes water, methyl alcohol, ethyl alcohol, isopropyl alcohol, benzene, toluene, xylene, cyclohexane, n-hexane, ethyl acetate, acetone, methyl ethyl ketone, etc. In consideration of handling and reaction facilities, the solvent is preferably water, methyl alcohol, ethyl alcohol or isopropyl alcohol.

As an aqueous polymerization initiator, ammonium persulfate, an alkali metal salt, hydrogen peroxide or a water-soluble azo compound such as 2,2'-azobis(2-amidinopropane)dihydrochloride or 2,2'-azobis(2-methylpropionamide) dihydrate is used. For solvent polymerization using a non-aqueous solvent, a peroxide such as benzoyl peroxide, lauroyl peroxide or the like, or an aliphatic azo compound such as azobisisobutyronitrile is used as the polymerization initiator.

Examples of a chain transfer agent include thiol-based chain transfer agents and hydrocarbon halide-based chain transfer agents, among which thiol-based chain transfer agents are preferable.

As the thiol-based chain transfer agent, one having a —SH group is preferable. More preferable is one represented by the formula HS-R-Eg wherein R represents a group derived from a hydrocarbon having 1 to 4 carbon atoms, E represents —OH, —COON, —COOR' or —SO$_3$M group, where M represents a hydrogen atom, a monovalent metal, a divalent metal, an ammonium group or an organic amine group, R' represents an alkyl group having 1 to 10 carbon atoms, and g denotes an integer from 1 to 2. Examples of the thiol-based chain transfer agent include mercaptoethanol, thioglycerol, thioglycolic acid, 2-mercaptopropionic acid, 3-mercaptopropionic acid, thiomalic acid, octyl thioglycolate and octyl 3-mercaptopropionate. Mercaptopropionic acid and mercaptoethanol are preferable and mercaptopropionic acid is more preferable from the viewpoint of a chain transfer effect in the copolymerization reaction of the system containing the monomer 1 to 3. One or two or more of these compounds may be used.

Examples of the hydrocarbon halide-based chain transfer agent include carbon tetrachloride and carbon tetrabromide.

Examples of other chain transfer agents may include α-methylstyrene dimer, terpinolene, α-terpinene, γ-terpinene, dipentene and 2-aminopropane-1-ol. These chain transfer agents may be used either alone or in combinations of two or more.

One example of the method of producing the polymer according to the present invention will be explained. A reactor is charged with a predetermined amount of water, the atmosphere in the reactor is substituted with inert gas such as nitrogen and the temperature of the reactor is raised. A mixture obtained by mixing and dissolving the monomer 1, the monomer 2, if necessary the monomer 3 and the chain transfer agent in water, and a mixture obtained by dissolving the polymerization initiator in water, are prepared in advance and are added dropwise in the reactor over 0.5 to 5 hours. At this time, each monomer, the chain transfer agent and the polymerization initiator may be added dropwise separately. Alternatively it may be adopted to charge a reactor with a monomer mixture solution and then add only the polymerization initiator dropwise. In other words, the chain transfer agent, the polymerization initiator and other additives may be added as an additive solution separately from the monomer solution. They may be mixed with the monomer solution for addition. They are preferably fed to the reaction system as the additive solution separately from the monomer solution in view of the stability of polymerization. The reaction solution is preferably cured for a predetermined time. The polymerization initiator may be added dropwise either in whole amount simultaneously with the monomers or in divided portions. It is however preferable to add the initiator in divided portions with the view of reducing unreacted monomers. For example, it is preferable that together the monomers, the polymerization initiator is added in an amount of from ½ to ⅔ relative to the total amount of the polymerization initiator to be finally added, and the mixture is cured for 1 to 2 hours after dropwise addition of the monomers, followed by adding the remainder initiator. After curing, the cured solution is neutralized by an alkali (for example, sodium hydroxide) if necessary to give the copolymer of the present invention.

The copolymer of the present invention can be used in copolymerization reaction by introducing a solution A containing the monomer 1 and a solution B containing the monomer 2 into a reaction system, and the solutions A and B can be introduced into different reaction systems respectively. The solutions A and B in amounts of 90% or more by weight relative to the total amounts thereof to be introduced into the reaction system are preferably simultaneously introduced into the reaction system. Specific methods of introducing the solutions A and B into the reaction system include dropping and spraying, and dropping is preferable from the viewpoint of the viscosities of the solutions A and B. From the viewpoint of coagulation point, the solution A preferably uses a water-containing solvent, and from the viewpoint of hydrolysis, the solution B preferably uses a water-free solvent. The distance of a nozzle (inlet opening) for the solution A and a nozzle (inlet opening) for the solution B may be arbitrarily established. Dropping may be carried in air or liquid, but from the viewpoint of introducing the whole of the solution, dropping in air is preferable. The nozzle diameter is preferably smaller for solubility and for increasing the surface area of droplets. By introducing the solutions A and B separately into the reaction system, the opportunity for the monomer 2 to contact with water is reduced, thus suppressing hydrolysis. The solutions A and B in amounts of 90% or more by weight relative to the total amounts thereof to be introduced into the reaction system are simultaneously introduced into the reaction system, whereby a copolymer composed of the respective monomers randomly introduced into it can be obtained. Because the solutions A and B are simultaneously added in amounts of 90% or more by weight relative to the total amounts thereof, the amounts of the solutions A and B introduced separately into the reaction system are 10% or less by weight based on the total amounts of the solutions A and B introduced into the reaction system.

In production of the copolymer of the present invention, the copolymerization molar ratio of the monomer 1 to the monomer 2 is changed once or more during polymerization, from the viewpoint of the materials, temperature, and versatility in compounding.

The weight-average molecular weight of the copolymer of the present invention (polyethylene glycol-equivalent molecular weight by gel permeation chromatography) is preferably in the range of 5000 to 200000, more preferably 10000 to 150000, from the viewpoint of fluidity retainability.

The dispersion-retaining agent for a hydraulic composition of the present invention can be used as an aqueous solution containing the copolymer.

<Hydraulic Composition Admixture>

The hydraulic composition admixture of the present invention contains the dispersion-retaining agent for a hydraulic composition of the present invention and a polymer A containing at least one group selected from a carboxylic acid group, a phosphoric acid group, a sulfonic acid group and their neutralized group (referred to hereinafter as polymer A). The polymer A is a polymer generally known as an admixture (dispersant or the like) for a hydraulic composition. The hydraulic composition admixture of the present invention can be used as an aqueous solution containing the dispersion-retaining agent and the polymer A.

Among the polymers A, the polymer having a carboxylic acid group or its neutralized group is a polymer having an oxyalkylene group or a polyoxyalkylene group and carboxylic acid. Examples include a polyalkylene glycol monoester monomer having 110 to 300 oxyalkylene groups each having 2 to 3 carbon atoms introduced per molecule, and an acrylic acid polymer, shown in JP-A 7-223852, polymers such as polymers A and B shown in JP-B 2004-519406, polymers containing amide macromonomers described in JP-A 2004-210587 and JP-A 2004-210589, and polymers containing polyethylene imine described in JP-A 2003-128738 and JP-A 2006-525219.

Commercial products of the polymer A having a carboxylic acid group or its neutralized group include, but are not limited to, (1) Reobuild SP8LS/8LSR, SP8LS, SP8LSR, SP8N, SP8S, SP8R, SP8SE/8RE, SP8SE, SP8RE, SP8SB series (S type, M type, L type, LL type), SP8HE, SP8HR, SP8SV/8RV, SP8RV, SP8HU, SP9N, SP9R, SP9HS and Reobuild 8000 series manufactured by BASF Pozzolith, Ltd., (2) Sikament 1100NT, Sikament 1100NTR and Sikament 2300 manufactured by Sika Ltd., (3) Flowrick SF500S (500SB), Flowrick SF500H and Flowrick SF500R (500RB) manufactured by manufactured by (k.k.) Flowrick Co., Ltd., (4) Tuepole HP-8, Tuepole HP-11, Tuepole HP-8R, Tuepole HP-11R, Tuepole SSP-104, Tuepole NV-G1 and Tuepole NV-G5 manufactured by Takemoto Oil & Fat Co., Ltd., (5) Aqualock FC600S and Aqualock FC900 manufactured by Nippon Shokubai Co., Ltd., and (6) Malialim AKM and Malialim EKM manufactured by Nippon Oil & Fats Co., Ltd.

Among the polymers A, the polymer having a phosphoric acid group or its neutralized group is a polymer having a polyoxyalkylene group and a phosphoric acid group. Examples include polymers described in JP-A 2006-052381. Specific examples include a copolymer composed of a polyalkylene glycol monoester monomer having 3 to 200 oxyalkylene groups each having 2 to 3 carbon atoms added on the average per molecule, di(2-hydroxyethyl)methacrylic acid phosphate, and mono(2-hydroxyethyl)methacrylic acid phosphate.

Among the polymers A, the polymer having a sulfonic acid group or its neutralized group includes a naphthalene polymer (for example, Mighty 150 manufactured by Kao Corporation), a melamine polymer (for example, Mighty 150V-2 manufactured by Kao Corporation), an aminosulfonic acid polymer (for example, Parick FP manufactured by Fujisawa Kagaku Co., Ltd.).

The content (solid content) of the dispersion-retaining agent of the present invention in the hydraulic composition admixture of the present invention is preferably 1 to 99% by weight, more preferably 2 to 80% by weight and even more preferably 5 to 70% by weight. The content (solid content) of the polymer A is preferably 1 to 99% by weight, more preferably 20 to 98% by weight and even more preferably 30 to 95% by weight. Two or more dispersion-retaining agents can be used. However, in this case, the total content of the two or more dispersion-retaining agents is preferably in the above range. Two or more polymers A can be used. However, in this case, the total content of the two or more polymers A is preferably in the above range. The weight ratio of the dispersion-retaining agent to the polymer A (dispersion-retaining agent/polymer A ratio (in terms of solid content)) in the hydraulic composition admixture is preferably 1/99 to 95/5, more preferably 5/95 to 80/20, even more preferably 10/90 to 60/40 and even more preferably 20/80 to 40/60, from the viewpoint of fluidity and fluidity retainability.

In the hydraulic composition admixture of the present invention, in addition to the polymer A, known additives may be used in combination, such as a high-performance water reducing agent, an AE agent, an AE water reducing agent, a fluidizer, a retardant, an early strengthening agent, a promoter, a bubbling agent, a foaming agent, a defoaming agent, a thickener, a waterproof agent, an antifoam agent, silica sands, blast-furnace slag, fly ash, and silica fume.

<Hydraulic Composition>

The hydraulic composition of the present invention contains the dispersion-retaining agent for a hydraulic composition according to the present invention, the polymer A, hydraulic powder, and water. To obtain the hydraulic composition of the present invention, the dispersion-retaining agent of the present invention and the polymer A may be previously mixed before use or may be used separately.

The hydraulic powder used in the hydraulic composition of the present invention is a powder having such a property that it is cured by a hydration reaction. Examples of the hydraulic powder include cements and gypsum. Preferable examples of the hydraulic powder include cements such as normal Portland cement, belite cement, moderate heat cement, early strength cement, super early strength cement and anti-sulfuric acid cement. Also, furnace slag, fly ash, silica fume, stone powder (calcium carbonate powder) or the like may be added to these cements. Hydraulic compositions which are finally obtained by adding sand, or sand and ballast, as aggregates to these powders are called mortar or concrete. The hydraulic composition of the present invention is useful in the fields of ready-mixed concrete and concrete vibration products and also in all other various concrete fields such as self-leveling concrete, flame retardant concrete products, plaster concrete, gypsum slurry concrete, light-weight concrete or heavy-weight concrete, AE concrete, repairing concrete, prepacked concrete, tremie concrete, grout concrete, foundation improvement concrete, and concretes used in freezing weather.

Particularly in a production site of ready-mixed concrete, concretes using normal Portland cement, moderate heat Portland cement and furnace slag cement are usually simultaneously produced, and also concretes with various compositions different in water/powder ratio are routinely produced. Under these circumstances, less fluctuation in fluidity and fluidity retainability regardless of cement quality is of significance. Recently, fluctuation in fluidity retainability may be confirmed even in some lots of normal Portland cement, and it is of significance to provide versatile fluidity retainability.

The ratio of water/hydraulic powder ratio (weight percentage of water/hydraulic powder (wt %) in the slurry, usually abbreviated as W/P, or sometimes as W/C when the powder is cement) in the hydraulic composition of the present invention may be 60% by weight or less, preferably 58 to 15% by weight, more preferably 57 to 18% by weight, even more preferably 56 to 20% by weight and even more preferably 55 to 23% by weight.

In the hydraulic composition, the hydraulic composition admixture of the present invention is added in a ratio (in terms of solid content) of 0.02 to 10 parts by weight, more preferably 0.02 to 5 parts by weight and even more preferably 0.05 to 2 parts by weight to 100 parts by weight of the hydraulic powder. The dispersion-retaining agent is added in a ratio (solid content) of 0.002 to 5 parts by weight, more preferably 0.01 to 4 parts by weight and even more preferably 0.02 to 2 parts by weight to 100 parts by weight of the hydraulic powder. The polymer A is added in a ratio (solid content) of 0.01 to 8 parts by weight and more preferably 0.02 to 4 parts by weight to 100 parts by weight of the hydraulic powder.

EXAMPLES

Figure 1:
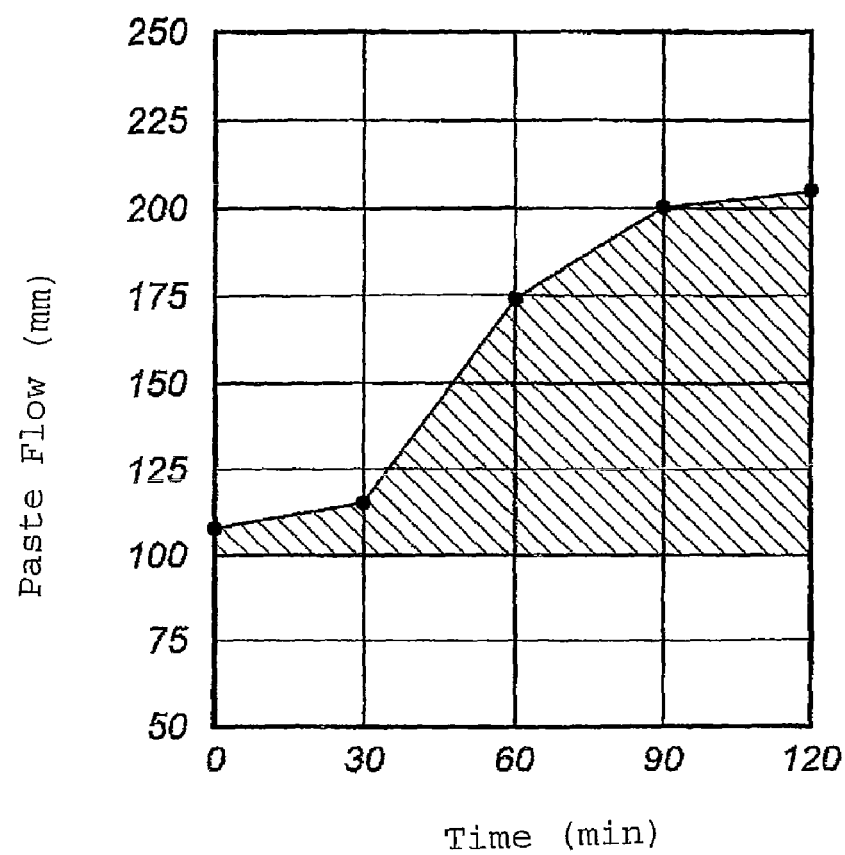
FIG. 1 is a graph showing a figure whose area is measured to evaluate fluidity retainability.

Hereinafter, the present invention is described in detail by reference to the Examples. The Examples are set forth for illustrative purposes only and not intended to limit the present invention.

Production Examples

Production Example 1

A glass reactor (four-neck flask) equipped with a stirrer was charged with 364.9 g of water, the atmosphere in the reactor was substituted with nitrogen with stirring, and the temperature of the water was raised to 80° C. in a nitrogen atmosphere. Two solutions, that is, a monomer solution prepared by mixing and dissolving 475.3 g of ω-methoxypolyethylene glycol monomethacrylate (number of ethylene oxide units added on the average per molecule, 23; water content 34.9%; purity 93.6%), 90.6 g of hydroxyethyl acrylate (indicated as HEA in the table) and 3.31 g of 3-mercaptopropionic acid (reagent, Sigma Aldrich Japan), and an aqueous solution of ammonium persulfate (I) (solution of 4.75 g ammonium persulfate (reagent, Wako Pure Chemical Industries, Ltd.) in 45 g water), were respectively added dropwise to the water over 1.5 hours. Then, an aqueous solution of ammonium persulfate (II) (solution of 0.71 g ammonium persulfate in 15 g water) was added dropwise to the mixture over 0.5 hour. Thereafter, the mixture was cured at 80° C. for 1 hour. After curing, the reaction mixture was neutralized with 20% aqueous sodium hydroxide to give a polymer (dispersion-retaining agent). The hydroxyethyl acrylate is a compound having a molecular weight of 116.1, represented by formula (2) wherein $R^5$ is a hydroxyethyl group and the log P value of the compound represented by $R^5$—OH is −1.369. Accordingly, the hydroxyethyl acrylate has (log P value/molecular weight (Mw) of the monomer 2) =−1.369/116.1=−0.0118.

The ω-methoxypolyethylene glycol methacrylate was synthesized by esterification reaction, then distilling away unreacted materials and remaining methacrylic acid until their amounts are reduced to less than 1% by weight, according to a method described in JP-B 3874917.

Specifically, methacrylic acid and polyalkylene glycol monoalkyl ether were subjected to esterification reaction in the presence of p-toluenesulfonic acid as an acid catalyst and hydroquinone as a polymerization inhibitor, then the acid catalyst was inactivated with sodium hydroxide as an alkali, and the unreacted methacrylic acid was distilled away by vacuum distillation.

Production Examples 2 to 17 and Comparative Examples 1 to 8

Copolymers (dispersion-retaining agents) were prepared from the monomers and proportions shown in Table 1 in the same manner as in Production Example 1. The resulting copolymers were used in the Examples and Comparative Examples below.

TABLE 1

| | | | Monomer | | | | | | |
|---|---|---|---|---|---|---|---|---|---|
| | | | Kind | | | | Molar ratio | | |
| | Dispersion-retaining agent No. | | Monomer 1 | Monomer 2 | | Monomer 3 | Monomer 1 | Monomer 2 | |
| | | | | Monomer 2-1 | Monomer 2-2 | | | Monomer 2-1 | Monomer 2-2 |
| Production example | 1 | Invented product 1 | ME-PEG (23) | HEA | — | — | 25 | 75 | — |
| | 2 | Invented product 2 | ME-PEG (23) | HEA | — | — | 20 | 80 | — |
| | 3 | Invented product 3 | ME-PEG (23) | HEA | — | — | 15 | 85 | — |
| | 4 | Invented product 4 | ME-PEG (23) | HEA | — | — | 10 | 90 | — |
| | 5 | Invented product 5 | ME-PEG (23) | HEA | — | — | 6.5 | 93.5 | — |
| | 6 | Invented product 6 | ME-PEG (23) | HEA | — | — | 4 | 96 | — |
| | 7 | Invented product 7 | ME-PEG (9) | HEA | — | — | 15 | 85 | — |
| | 8 | Invented product 8 | ME-PEG (45) | HEA | — | — | 10 | 90 | — |
| | 9 | Invented product 9 | ME-PEG (120) | HEA | — | — | 10 | 90 | — |
| | 10 | Invented product 10 | ME-PEG (120) | HEA | — | — | 5 | 95 | — |
| | 11 | Invented product 11 | ME-PEG (120) | HEA | — | — | 2.5 | 97.5 | — |
| | 12 | Invented product 12 | ME-PEG (120) | HEA | — | — | 1.5 | 98.5 | — |

TABLE 1-continued

|   |    |                      |              |      |     | Methacrylic |      |      |      |
|---|----|----------------------|--------------|------|-----|-------------|------|------|------|
|   | 13 | Invented product 13  | ME-PEG (120) | HEA  | —   | —           | 0.8  | 99.2 | —    |
|   | 14 | Invented product 14  | ME-PEG (120) | HEA  | —   | —           | 15   | 85   | —    |
|   | 15 | Invented product 15  | ME-PEG (23)  | HEA  | MA  | —           | 15   | 42.5 | 42.5 |
|   | 16 | Invented product 16  | ME-PEG (23)  | HEA  | —   | Methacrylic acid | 14.7 | 77.8 | —    |
|   | 17 | Invented product 17  | ME-PEG (23)  | HEA  | —   | Methacrylic acid | 14.4 | 70.6 | —    |
| Comparative | 1 | Comparative product 1 | ME-PEG (23) | HEA | — | — | 30 | 70 | — |
| production  | 2 | Comparative product 2 | — | HEA | — | — | — | 100 | — |
| example     | 3 | Comparative product 3 | ME-PEG (23) | — | MA | — | 20 | — | 80 |
|             | 4 | Comparative product 4 | ME-PEG (23) | — | HBA | — | 15 | — | 85 |
|             | 5 | Comparative product 5 | ME-PEG (23) | — | MHEA | — | 15 | — | 85 |
|             | 6 | Comparative product 6 | ME-PEG (23) | — | HEMA* | — | 15 | — | 85 |
|             | 7 | Comparative product 7 | ME-PEG (120) | — | MA | Methacrylic acid | 10 | — | 70 |
|             | 8 | Comparative product 8 | ME-PEG (23) | HEA | — | Methacrylic acid | 13.9 | 57.5 | — |

| | | | Monomer | | | | | |
| | | | | | Weight ratio | | | Weight |
| | | | Monomer ratio | | Monomer 2 | | | average |
| | | | Monomer 3 | Monomer 1 | Monomer 2-1 | Monomer 2-2 | Monomer 3 | molecular weight |
|---|---|---|---|---|---|---|---|---|
| Production example | 1 | | — | 76.2 | 23.8 | — | — | 58000 |
| | 2 | | — | 70.6 | 29.4 | — | — | 78000 |
| | 3 | | — | 62.9 | 37.1 | — | — | 47000 |
| | 4 | | — | 51.6 | 48.4 | — | — | 52000 |
| | 5 | | — | 40 | 60 | — | — | 46000 |
| | 6 | | — | 28.5 | 71.5 | — | — | 42000 |
| | 7 | | — | 43 | 57 | — | — | 28000 |
| | 8 | | — | 66.4 | 33.6 | — | — | 28000 |
| | 9 | | — | 83.8 | 16.2 | — | — | 43000 |
| | 10 | | — | 71 | 29 | — | — | 34000 |
| | 11 | | — | 54.4 | 45.6 | — | — | 27000 |
| | 12 | | — | 41.5 | 58.5 | — | — | 34000 |
| | 13 | | — | 27.3 | 72.7 | — | — | 32000 |
| | 14 | | — | 89.2 | 10.8 | — | — | 46000 |
| | 15 | | — | 66 | 19.5 | 14.5 | — | 30000 |
| | 16 | | 7.5 | 62.9 | 34.6 | — | 2.5 | 50000 |
| | 17 | | 15 | 62.9 | 32.1 | — | 5 | 47000 |
| Comparative production example | 1 | | — | 80.4 | 19.6 | — | — | 59000 |
| | 2 | | — | — | 100 | — | — | 14000 |
| | 3 | | — | 76.4 | — | 23.6 | — | 27000 |
| | 4 | | — | 57.7 | — | 42.3 | — | 29000 |
| | 5 | | — | 60.2 | — | 39.8 | — | 22000 |
| | 6 | | — | 60.2 | — | 39.8 | — | 27000 |
| | 7 | | 20 | 87 | — | 10 | 3 | 77000 |
| | 8 | | 28.6 | 62.9 | 27.1 | — | 10 | 46000 |

*Note:
This monomer does not belong to the monomer 2 but is shown in the column "Monomer 2" for convenience' sake.

*Note:
This monomer does not belong to the monomer 2 but is shown in the column "Monomer 2" for convenience' sake.

Meanings of symbols in the table are as follows:

ME-PEG: ω-methoxypolyethylene glycol monomethacrylate; numerical value in round brackets shows the number of ethylene oxide units added on the average per molecule.

HEA: hydroxyethyl acrylate (ethylene glycol log P: −1.369, log P/Mw: −1.369/116.1 = −0.0118, a reagent manufactured by Wako Pure Chemical Industries, Ltd.)

MA: methyl acrylate (methanol log P: −0.764, log P/Mw: −0.764/86.1 = −0.0089, a reagent manufactured by Wako Pure Chemical Industries, Ltd.)

HBA: hydroxybutyl acrylate (butylene glyol log P: −1.164, log P/Mw: −1.164/144.2 = −0.0081, a reagent manufactured by Sigma Aldrich Japan)

MHEA: methoxyethyl acrylate (methoxy ethanol log P: −0.6064, log P/Mw: −0.6064/130.1 = −0.0047, a reagent manufactured by Wako Pure Chemical Industries, Ltd.)

HEMA: hydroxyethyl methacrylate (ester monomer not corresponding to formula (2), a reagent manufactured by Wako Pure Chemical Industries, Ltd.)

Example 1

Paste Reagent

<Paste Composition>

TABLE 2

| Composition 1 (paste composition) | | | |
|---|---|---|---|
| W/C | W | C1 or C2 | Dispersion-retaining agent |
| 30 wt % | 120 g | 400 g | 0.32 g* |

*0.08 parts by weight based on 100 parts by weight of cement
W: Tap water
C1: Normal Portland cement (Nihon Cement manufactured by Taiheiyo Cement Corporation)
C2: CEMI 52, 5R Gargenville (France Cement)

Water containing the cement and the dispersion-retaining agent in Table 1 (0.08 part by weight based on 100 parts by weight of cement) according to Composition 1 was introduced into a 500-ml container and kneaded for 2 minutes with a hand mixer (low speed of about 63 rpm) to give a paste. The paste containing C1 as C in Composition 1 was used in the following evaluation of fluidity retainability.

<Evaluation of Initial Fluidity and Fluidity Retainability>

The resulting paste was filled in a cylindrical cone (Φ50 mm×51 mm), and the spreading (mean of maximum diameter and length in the vertical direction) of the paste when raised perpendicularly was measured as paste flow. This measurement was carried out immediately (0 minute) after kneading, 30 minutes after kneading, 60 minutes after kneading, 90 minutes after kneading, and 120 minutes after kneading, to determine the change in flow value with time. As an indicator of fluidity retainability, the area of the figure shown in FIG. 1 was determined for each dispersion-retaining agent. The area of this figure is determined by (fluidity−100 mm)×time (unit: mm·min).

The flow value immediately after kneading was indicated as initial fluidity. The initial fluidity of the paste to which the dispersion-retaining agent had not been added was 110 mm.

TABLE 3

| Production example | Dispersion-retaining agent No. | Initial Fluidity (mm) | Fluidity Retainability (mm · min) |
|---|---|---|---|
| Production example 1 | Invented product 1 | 109 | 5025 |
| Production example 2 | Invented product 1 | 108.5 | 8018 |
| Production example 3 | Invented product 1 | 108.5 | 9150 |
| Production example 4 | Invented product 1 | 109 | 8250 |
| Production example 5 | Invented product 1 | 112 | 7425 |
| Production example 6 | Invented product 1 | 111 | 5310 |
| Production example 7 | Invented product 1 | 114 | 6150 |
| Production example 8 | Invented product 1 | 110 | 8550 |
| Production example 9 | Invented product 1 | 113 | 9488 |
| Production example 10 | Invented product 1 | 111 | 10710 |
| Production example 11 | Invented product 1 | 110 | 8925 |
| Production example 12 | Invented product 1 | 112.5 | 8408 |
| Production example 13 | Invented product 1 | 114 | 5700 |
| Production example 14 | Invented product 1 | 110 | 4875 |
| Production example 15 | Invented product 1 | 112 | 6615 |
| Production example 16 | Invented product 1 | 115 | 8655 |
| Production example 17 | Invented product 1 | 112 | 8370 |
| Comparative production example 1 | Comparative product 1 | 108 | 1800 |
| Comparative production example 2 | Comparative product 1 | 110 | 2475 |
| Comparative production example 3 | Comparative product 1 | 107 | 2250 |
| Comparative production example 4 | Comparative product 1 | 114.5 | −472 |
| Comparative production example 5 | Comparative product 1 | 115 | 2325 |
| Comparative production example 6 | Comparative product 1 | 114 | −510 |
| Comparative production example 7 | Comparative product 1 | 107.5 | 7358 |
| Comparative production example 8 | Comparative product 1 | 132 | 10343 |

From the results in Table 3, the following conclusions are obtained.

(1) Copolymers in Production Examples 1 to 6, Production Examples 9 to 14, and Comparative Production Examples 1 to 2

From the relationship between the copolymerization composition ratio of methoxypolyethylene glycol monomethacrylate (number of ethylene oxide units added on the average per molecule: 23) to hydroxyethyl acrylate and fluidity retainability, Invented Product 3 (monomer 1, 62.9% by weight; monomer 2, 37.1% by weight) showed the maximum fluidity retainability. From the relationship between the copolymerization composition ratio of methoxypolyethylene glycol monomethacrylate (number of ethylene oxide units added on the average per molecule: 120) to hydroxyethyl acrylate and fluidity retainability, Invented Product 10 (monomer 1, 71.0% by weight; monomer 2, 29.0% by weight) showed the maximum fluidity retainability.

Because the fluidity retaining performance is preferably a performance of 6000 mm·min or more, there is a preferable range for the upper and lower limits of the copolymerization composition ratio of the methoxypolyethylene glycol monomer (monomer 1) to the hydroxyethyl acrylate monomer (monomer 2).

It is considered that when the content of the monomer 1 is high, stability in a liquid phase is improved, and thus the adsorptivity is lowered and the residual degree in a liquid phase is increased. Accordingly, the fluidity retainability of Comparative Product 1 is considered to decrease.

It is considered that when the content of the monomer 1 is decreased in Invented Products 3 to 6, steric repulsive units are decreased, and thus the fluidity expressing effect is lowered. It is considered that because Comparative Product 2 is free of steric repulsive units, the fluidity retainability is lowered.

(2) Copolymers in Production Examples 3, 7, 8 and 10 and Comparative Production Example 2

With respect to the influence of the number of alkylene oxide units added on overage per molecule, the fluidity retainability tends to be improved as the number of the units added on the average per molecule, and when the number of the units added is 23 or more, excellent retainability was confirmed. The fluidity retainability of Comparative Product 2 to which alkylene oxide units were not added is lowered.

(3) Copolymers in Production Examples 2 to 3, Production Example 15, and Comparative Production Examples 3 to 6

With respect to the influence of the acrylate, hydroxyethyl acrylate (Invented Products 2 and 3) was excellent in fluidity retention performance, and methyl acrylate (Comparative Product 3), hydroxybutyl acrylate (Comparative Product 4), methoxyethyl acrylate (Comparative Example 5) and hydroxyethyl methacrylate (Comparative Example 6) were poor in retention performance. This is considered mainly attributable to reduction in the degree of hydrolysis because of deterioration in the hydrophilicity of hydrolysable groups and/or steric hindrance. It is considered that when the molecular weight of a leaving group is large, the efficiency of hydrolysis is excellent, but the loss in molecular weight is increased and the performance is deteriorated.

Hydroxyethyl methacrylate (Comparative Example 6) was poor in retention performance. This is considered attributable to suppression of hydrolysis by the shielding effect of carbon at the α-position.

It was confirmed that excellent fluidity retainability is obtained even by combining hydroxyethyl acrylate with methyl acrylate (Invented Product 15). However, Invented Product 3 wherein hydroxyethyl acrylate is 100 mol % in the monomer 2 is superior thereto in fluidity retainability.

(4) Copolymers in Production Example 3, Production Examples 16 to 17, and Comparative Production Example 8

It can be seen that when hydroxyethyl acrylate is replaced by methacrylic acid, the polymer can exhibit the function thereof as the dispersion-retaining agent of the present invention without exhibiting initial fluidity up to a substation amount of 5% by weight (Invented Product 17).

However, the copolymer when substituted by 10% by weight (Comparative Product 8) shows initial fluidity and is thus not suitable as the dispersion-retaining agent intended to regulate fluidity retainability only. When the copolymer thus shows initial fluidity, the operation of reducing the amount of the dispersant to be added is necessary, resulting undesirably in difficult control of concrete thickening and fluidity retainability. When 10% by weight of methacrylic acid in the monomer 3 in Comparative Product 8 is replaced by 3% by weight of methacrylic acid and 7% by weight of methyl acrylate, the resulting copolymer shows fluidity retainability, nearly without the initial fluidity, and can thus be used as the dispersion-retaining agent of the present invention. In this case, even if the amount of the monomer 1 is the same, the amount of methyl acrylate relative to hydroxyethyl acrylate is higher than in Invented Product 16. Therefore, Invented Product 16 is estimated to be more superior in fluidity retainability.

Figure 5:
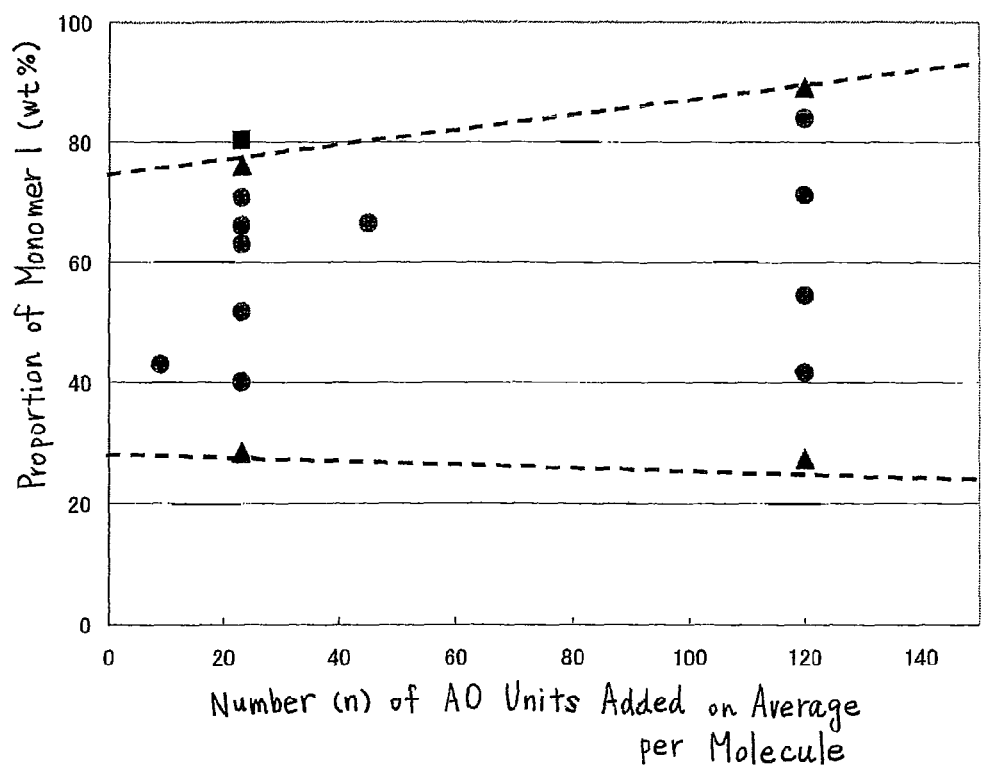
FIG. 5 is a graph showing the relationship among the proportion of monomer 1 in the constituent monomers in the copolymer, the number (n) of AO units added on the average to one molecule of the monomer 1, and fluidity retainability, in Example 1 (Table 3).

FIG. 5 shows the relationship from the results in Table 3, that is, the relationship among the proportion of monomer 1 in the constituent monomers in the copolymer, the number (n) of AO units added on the average to one molecule of monomer 1, and fluidity retainability. In FIG. 5, ● indicates Invented Products 2 to 5, 7 to 12, and 15 to 17 (fluidity retainability: 6000 mm·min or more), ▲ indicates Invented Products 1, 6, 13 and 14 (fluidity retainability: less than 6000 mm·min), and ■ indicates Comparative Product 1.

<Evaluation of Versatility>

Some dispersion-retaining agents in Table 1 were used in Composition 1 in Table 2 wherein C2 was used as C, and the resulting compositions were evaluated. These compositions were evaluated for their fluidity retainability and versatility. The fluidity retainability was evaluated in the same manner as in the fluidity retainability described above. The ratio of the fluidity retainability where C1 (Nihon cement) was used as cement to the fluidity retainability where C2 (France cement) was used was calculated according to the following equation and used as an indicator of versatility. The results are shown in Table 4.

Versatility (%)=(Fluidity retainability of France cement/fluidity retainability of Nihon Cement)×100

TABLE 4

| Production example | Dispersion-maintaining agent No. | Fluidity retainability (mm · min) | Versatility (%) |
|---|---|---|---|
| Production example 2 | Invented product 2 | 3255 | 40.6 |
| Production example 3 | Invented product 3 | 5070 | 55.4 |
| Production example 7 | Invented product 7 | 3720 | 60.5 |
| Production example 8 | Invented product 8 | 4890 | 57.2 |

TABLE 4-continued

| Production example | Dispersion-maintaining agent No. | Fluidity retainability (mm · min) | Versatility (%) |
|---|---|---|---|
| Production example 9 | Invented product 9 | 3158 | 33.3 |
| Production example 10 | Invented product 10 | 6308 | 58.9 |
| Production example 11 | Invented product 11 | 5940 | 66.6 |
| Comparative production example 7 | Comparative product 7 | 297 | 4.0 |

The concentration of eluted sulfate ions from the cement used in the Examples was 8900 ppm for Nihon cement (C1) and 18900 ppm for France cement (C2), and thus the concentration of eluted sulfate ions from C2 is about twice as high as that from C1, so the adsorption of the dispersion-remaining agent can be inhibited, which would result in easy deterioration of fluidity retainability.

The numerical value of versatility in this evaluation is preferably 40% or more, but any systems using hydroxyethyl acrylate showed excellent versatility. On the other hand, the system using only methyl acrylate (Comparative Product 7) showed excellent fluidity retainability for Nihon cement, but was deteriorated in respect of versatility. This is possibly because methyl acrylate is inferior in hydrolysis efficiency to hydroxyethyl acrylate, thus resulting in a lower amount of absorbing groups formed therefrom and in lower absolute adsorption. This is estimated to permit considerable influence upon adsorption inhibition.

From the above viewpoint, it is estimated that when the content of the methoxypolyethylene glycol monomer (monomer 1) in the system using hydroxyethyl acrylate is lower to such an extent as not to deteriorate fluidity retainability, the adsorption amount is increased and versatility is improved (which can be seen by comparison of Invented Products 9 to 11 for example).

<Evaluation of Viscosity with Time>

Figure 2:
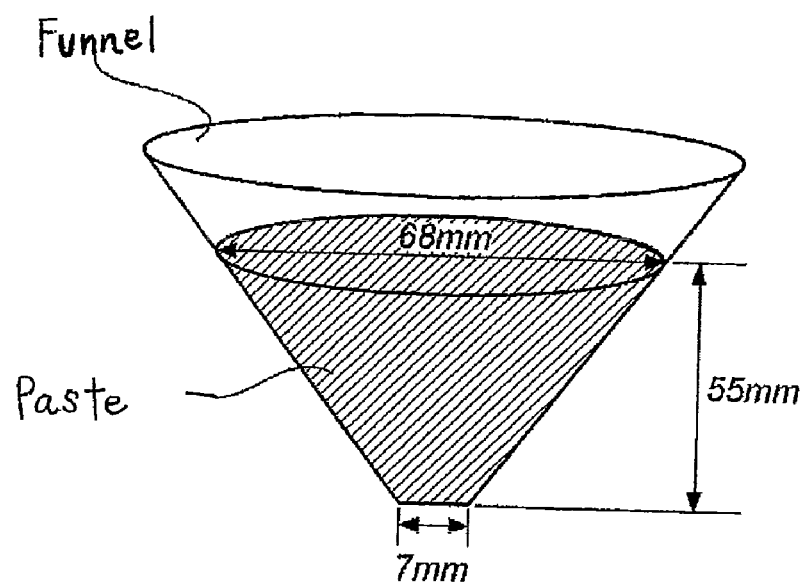
FIG. 2 is a schematic view of a funnel used in measurement of the dropping time of paste in the evaluation of the examples.

Some of the dispersion-retaining agents in Table 1 were used to evaluate viscosity with time. 120 minutes after kneading, paste was dropped from a funnel (lower opening diameter: 7 mm) (the distance between the upper surface of the paste and the lower opening of the funnel was 55 mm) as shown in FIG. 2, and the dropping time was measured for evaluating viscosity. A product obtained by multiplying the viscosity of the paste 120 minutes after kneading by the flow value (mm) of the paste measured as described above 120 minutes after kneading (that is, viscosity after 120 minutes× fluidity after 120 minutes) was used as an indicator of reduction in viscosity with time. The results are shown in Table 5.

TABLE 5

| Production example | Dispersion-retaining agent No. | Fluidity (mm) after 120 minutes | Viscosity (sec) after 120 minutes | Indicator of viscosity with time after 120 minutes (mm · sec) |
|---|---|---|---|---|
| Production example 3 | Invented product 3 | 189 | 6.8 | 1285 |
| Production example 7 | Invented product 7 | 162 | 8.1 | 1312 |
| Production example 8 | Invented product 8 | 184 | 7.9 | 1454 |
| Production example 10 | Invented product 10 | 189 | 8.8 | 1663 |
| Production example 14 | Invented product 11 | 178 | 11.1 | 1976 |

The effect of the dispersion-retaining agent on reduction of viscosity with time is preferably lower, and the indicator of reduction in viscosity with time is preferably 1500 mm·sec or less. From the above viewpoint, the number of AO units added on the average per molecule is considered to be preferably 45 or less.

Example 2

Mortar Test

<Mortar Composition>

TABLE 6

| Composition 2 (Mortar composition) | | | |
|---|---|---|---|
| W/C | W | C | S |
| 30 wt % | 120 g | 400 g | 700 g |

W: Tap water
C: Normal Portland cement (manufactured by Taiheiyo Cement Corporation)
S: Pit sand from Kimitsu, Ciba prefecture (3.5 mm-pass product)

(2) Preparation of Mortar

S was poured in an amount of about ½ relative to the amount shown in the composition in Table 6, then C was poured, and then the remainder of S was poured into a container (1 L stainless beaker: inner diameter 120 mm) and these components were dry-mixed using a stirrer EYELA Z-2310 (manufactured by Tokyo Rikakikai, stirring rod: height 50 mm, inner diameter 5 mm×6 rods/length 110 mm) at 200 rpm for 25 seconds. Then, a previously prepared mixed solution of a dispersant and water was poured over 5 seconds. After the mixed solution was poured, materials on the wall surface and between the stirring rods were scraped off, water was poured and then the mixture was kneaded for 3 minutes to prepare mortar. The amount of the dispersant was regulated such that the mortar flow of the mortar just after kneading became 170 mm. If necessary, an antifoaming agent was added in an amount regulated such that the amount of air to be entrained was 2% or less. After kneading, the number of revolutions was set at 50 rpm, and the viscosity of the mortar just after kneading was measured.

The admixture used was a combination wherein the dispersion-retaining agent in Table 1 and the following polymer (dispersant) are used as shown in Table 7.

PP1: Phosphate dispersant (polymer in Example 2-1, JP-A 2006-52381)

PP2: Phosphate dispersant (polymer in Example 2-6, JP-A 2006-52381)

PC: Polycarboxylic acid dispersant: FC900 manufactured by Nippon Shokubai Co., Ltd.

A 60-mm-high cone provided with an upper opening 70 mm in diameter and a lower opening 100 mm in diameter was used to determine mortar flow. The mortar flow value thus determined was the average of the maximum mortar flow value and a mortar flow value measured in a direction perpendicular, at a length ½ of the segment giving the maximum value, to the direction in which the maximum value was obtained.

Figure 3:
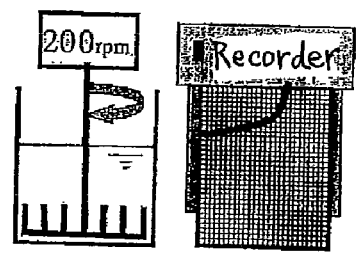
FIG. 3 is a schematic view of a torque tester and a recorder used in measurement of the viscosity of mortar in the evaluation of the examples.
Figure 4:
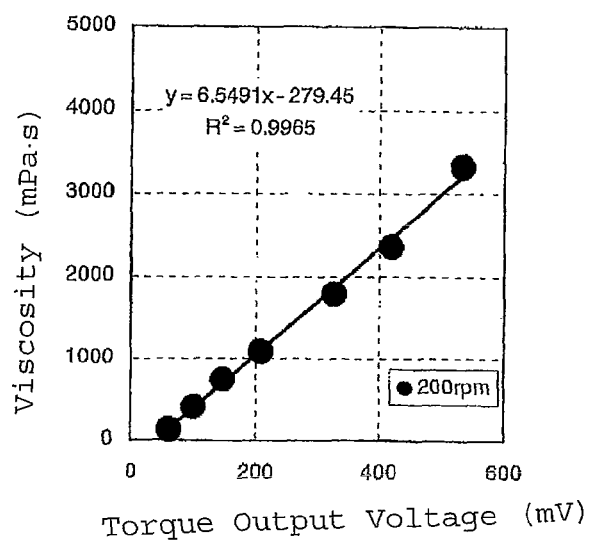
FIG. 4 is the torque-viscosity relation of polyethylene glycol (weight average molecular weight: 20,000) used for calculation of the viscosity of mortar in the evaluation of the examples.

The mortal viscosity was measured as follows: A recorder was connected to the torque tester shown in FIG. 3 to measure the torque of the mortar. The viscosity of the mortar was calculated from the torque of the mortar based on the torque-viscosity relationship made in advance by using polyethylene glycol (Mw: 20,000) as shown in FIG. 4. When the torque-viscosity relationship using polyethylene glycol is made, a record of a torque output voltage (mV) is taken out from the recorder in the condition of a monitor output of 60 W and an output signal DC of 0 to 5 V.

After experiments were carried out with different amounts of the admixture, mortar was prepared such that the mortar flow immediately (0 minute) after kneading, 30 minutes after kneading and 60 minutes after kneading became 180 mm, and its viscosity was measured. The results are shown in Table 7.

TABLE 7

| Hydraulic composition admixture | | Mortar viscosity (mPA · sec) at Mortar Flow of 180 mm | | |
|---|---|---|---|---|
| Compounding component | Weight ratio | 0 minute after kneading | 30 minutes after kneading | 60 minutes after kneading |
| Admixture (A) PP1 | 40 | 3798 | 7122 | 9499 |
| PP2 | 30 | | | |
| PC | 10 | | | |
| Comparative product 7 | 20 | | | |
| Admixture (B) PP1 | 40 | 3451 | 6247 | 6559 |
| PC | 20 | | | |
| Invented product 1 | 10 | | | |
| Invented product 2 | 10 | | | |
| Invented product 3 | 10 | | | |
| Invented product 4 | 10 | | | |

The invention claimed is:

1. A dispersion-retaining agent for a hydraulic composition, comprising a copolymer obtained by polymerizing monomers, said copolymer comprising monomer 1 represented by formula (1):

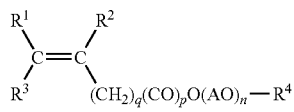
(1)

wherein $R^1$ to $R^3$ each represent a hydrogen atom or a methyl group,

AO represents an oxyalkylene group having 2 carbon atoms, n represents the number of AO units added on the average per molecule and is a number of 5 to 50, $R^4$ represents a hydrogen atom or an alkyl group having 1 to 4 carbon atoms, q represents an integer of 0 to 2, and p represents 0 or 1, and monomer 2 represented by formula (2):

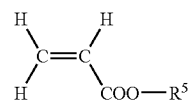
(2)

wherein $R^5$ represents a hydroxyethyl group optionally containing a heteroatom, wherein:

in the constituent monomers of the copolymer, the proportion of the monomer 1 is 28 to 78% by weight when n in formula (1) is 5 to 50, in the constituent monomers of the copolymer, the total proportion of the monomers 1 and 2 is 90% by weight or more, at least a part of the monomer 2 are monomer 2 wherein $R^5$ represents the hydroxyethyl group optionally containing a heteroatom and has an OH group at the β-position of $R^5$, in the constituent monomers of the copolymer, the proportion of monomer 2 is 22 to 72 wt %, and in the constituent monomers of the copolymer, the proportion of monomers having at least one group selected from the group consisting of a carboxylic acid group, a phosphoric acid group and a neutralized group thereof is 2.5% by weight or less.

2. The dispersion-retaining agent for a hydraulic composition according to claim 1, wherein the proportion of the monomer 2 represented by formula (2) wherein $R^5$ represents a hydrocarbon group having 2 or 3 carbon atoms optionally containing a heteroatom and has an OH group at the β-position of $R^5$ is 30 mol % or more based on the total monomer 2.

3. The dispersion-retaining agent for a hydraulic composition according to claim 1, wherein the weight ratio of the monomer 1 to the monomer 2 (monomer 1/monomer 2) is 25/75 to 95/5.

4. The dispersion-retaining agent for a hydraulic composition according to claim 1, wherein the proportion of the monomers satisfying the relationship: (log P value of an alcohol compound $R^5$—OH corresponding to $R^5$ in formula (2)/molecular weight (Mw) of the monomer 2) <−0.009 is 30 mol % or more in the total monomer 2.

5. A hydraulic composition admixture comprising the dispersion-retaining agent for a hydraulic composition of claim 1, and a polymer A having at least one group selected from the group consisting of a carboxylic acid group, a phosphoric acid group, a sulfonic acid group and a neutralized group thereof.

6. The hydraulic composition admixture according to claim 5, wherein the weight ratio of the dispersion-retaining agent for a hydraulic composition to the polymer A (dispersion-retaining agent/polymer A) is from 5/95 to 80/20.

7. A hydraulic composition comprising the dispersion-retaining agent for a hydraulic composition of claim 1, a polymer A having at least one group selected from the group consisting of a carboxylic acid group, a phosphoric acid group, a sulfonic acid group and a neutralized group thereof, a hydraulic powder and water.

8. A method of maintaining the dispersion of a hydraulic composition, which comprises mixing the copolymer described in claim 1, with a hydraulic composition comprising a polymer A having at least one group selected from the group consisting of a carboxylic acid group, a phosphoric acid group, a sulfonic acid group and a neutralized group thereof, a hydraulic powder and water.

9. The dispersion-retaining agent for a hydraulic composition according to claim 1, wherein in formula (1) $R^1$ is hydrogen, $R^2$ is hydrogen, q is 0 and p is 1.

* * * * *